(12) United States Patent
Nakamura

(10) Patent No.: US 10,796,710 B2
(45) Date of Patent: Oct. 6, 2020

(54) NOISE ELIMINATION DEVICE, NOISE ELIMINATION METHOD, AND NOISE ELIMINATION PROGRAM

(71) Applicant: JVCKENWOOD Corporation, Yokohama-shi, Kanagawa (JP)

(72) Inventor: Masami Nakamura, Yokohama (JP)

(73) Assignee: JVCKENWOOD Corporation, Yokohama-shi (JP)

(*) Notice: Subject to any disclaimer, the term of this patent is extended or adjusted under 35 U.S.C. 154(b) by 0 days.

(21) Appl. No.: 16/596,818

(22) Filed: Oct. 9, 2019

(65) Prior Publication Data

US 2020/0043510 A1 Feb. 6, 2020

Related U.S. Application Data

(63) Continuation of application No. PCT/JP2018/005404, filed on Feb. 16, 2018.

(30) Foreign Application Priority Data

May 19, 2017 (JP) .................................. 2017-099995

(51) Int. Cl.
*G10L 21/02* (2013.01)
*H04M 9/08* (2006.01)
(Continued)

(52) U.S. Cl.
CPC .......... *G10L 21/0232* (2013.01); *G10L 21/02* (2013.01); *H04M 9/08* (2013.01); *H04R 3/00* (2013.01); *G10L 2021/02082* (2013.01)

(58) Field of Classification Search
CPC ........ H04M 9/08; H04M 9/082; H04M 19/00; H04M 19/04; G10L 21/00; G10L 21/02;
(Continued)

(56) References Cited

U.S. PATENT DOCUMENTS 6,351,532 B1 * 2/2002 Takada .................. H04M 9/082
379/406.01
7,359,504 B1 * 4/2008 Reuss .................... H04M 9/082
379/406.01
(Continued)

FOREIGN PATENT DOCUMENTS

EP 2811728 12/2014
JP 11-101656 4/1999

OTHER PUBLICATIONS

Extended European Search Report for European Patent Application No. 18802614.0 dated Mar. 4, 2020.
(Continued)

*Primary Examiner* — Thang V Tran
(74) *Attorney, Agent, or Firm* — Amin, Turocy & Watson, LLP

(57) ABSTRACT

A noise elimination device includes a first converter, a second converter, and a signal processing unit. The first converter is configured to convert an input signal input from a microphone into digital data to generate input digital data. The second converter is configured to convert an internal noise signal into digital data. The signal processing unit is configured to use, as reference data, digital data corresponding to an output signal output to a speaker and digital data having been converted by the second converter, and eliminate a component corresponding to the reference data from the input digital data.

8 Claims, 6 Drawing Sheets

(51) Int. Cl.
*H04R 3/00* (2006.01)
*G10L 21/0232* (2013.01)
*G10L 21/0208* (2013.01)

(58) Field of Classification Search
CPC ............ G10L 21/0208; G10L 21/0323; G10L 2021/02082; G10L 19/00; H04R 3/00; H04R 3/005; H04R 3/02; H04B 3/20; H04B 3/23; H04B 7/015; G06F 3/16; G06F 3/165
See application file for complete search history.

(56) References Cited

U.S. PATENT DOCUMENTS

| | | | |
|---|---|---|---|
| 2004/0052358 A1* | 3/2004 | Lashley | H04M 1/2475 379/387.01 |
| 2006/0188089 A1* | 8/2006 | Diethorn | H04M 9/082 379/406.01 |
| 2014/0133648 A1* | 5/2014 | Czyzewski | H04M 9/082 379/406.08 |
| 2014/0135078 A1* | 5/2014 | Nigam | H03G 3/00 455/570 |
| 2017/0310360 A1* | 10/2017 | Gejo | H04B 7/015 |
| 2019/0165832 A1* | 5/2019 | Khanduri | H04B 3/237 |

OTHER PUBLICATIONS

International Search Report and Written Opinion for International Patent Application No. PCT/JP2018/005404 dated Apr. 24, 2018, 8 pages.

\* cited by examiner

NOISE ELIMINATION DEVICE, NOISE ELIMINATION METHOD, AND NOISE ELIMINATION PROGRAM

CROSS-REFERENCE TO RELATED APPLICATION(S)

This application is a Continuation of PCT international application Ser. No. PCT/JP2018/005404 filed on Feb. 16, 2018 which designates the United States, incorporated herein by reference, and which claims the benefit of priority from Japanese Patent Application No. 2017-099995, filed on May 19, 2017, incorporated herein by reference.

BACKGROUND

1. Technical Field

The present invention relates to a noise elimination device, a noise elimination method, and a noise elimination program.

2. Description of the Related Art

There is a type of vehicle audio including, as a system that detects a voice of a driver, a system called "handsfree" (hereinafter, "handsfree system"). In a handsfree system, a voice of a user collected using a microphone is converted into digital data. As for analog signals in devices such as a microphone, there is a case where noise within the device interferes with a voice signal that is supposed to be input. For example, when noise interferes with a power source or a ground being used in an analog digital converter that is used in a handsfree system, digital data of a voice after being converted becomes data including the noise.

Japanese Laid-open Patent Publication No. H11-101656 is known as a technique of applying a noise eliminating process on a real-time basis to a digitized detection signal. In Japanese Laid-open Patent Publication No. H11-101656, a mean value of cumulative addition values of recently acquired detection signals is calculated, and the calculation result is used as a detection signal after the noise eliminating process has been applied.

In a handsfree system, there is a case where an echo elimination device is provided to eliminate acoustic echo. According to the technique described in Patent Literature 1, because it is necessary to calculate a mean value after performing cumulative addition processing to eliminate noise, there is a room for improvement with regard to applying the technique to a handsfree system.

SUMMARY

According to an aspect of the present disclosure, a noise elimination device includes a first converter configured to convert an input signal input from a microphone into digital data to generate input digital data; a second converter configured to convert an internal noise signal into digital data; and a signal processing unit configured to use, as reference data, digital data corresponding to an output signal output to a speaker and digital data having been converted by the second converter, and eliminate a component corresponding to the reference data from the input digital data.

According to another aspect of the present disclosure, a noise elimination method includes a step of converting an input signal input from a microphone into digital data by a first converter to generate input digital data; a step of converting an internal noise signal into digital data by a second converter; and a step of using, as reference data, digital data corresponding to an output signal output to a speaker and digital data having been converted by the second converter and of eliminating a component corresponding to the reference data from the input digital data by a signal processing unit.

According to a still another aspect of the present disclosure, a noise elimination program causes a computer to function as an addition unit configured to add digital data of an internal noise signal to reception data received from a communication counterpart; and an echo cancellation unit configured to subtract cancellation data, which is generated by using the added digital data as reference data and by processing the reference data based on characteristic information in which the reference data and characteristics of an echo path are simulated, from a transmission signal to the communication counterpart.

DETAILED DESCRIPTION OF THE PREFERRED EMBODIMENTS

An embodiment of the present invention will be described below in detail with reference to the accompanying drawings. In the descriptions of the following embodiment, identical or equivalent constituent parts are denoted by like reference signs and descriptions thereof will be simplified or omitted. The present invention is not limited to the embodiment. Further, constituent elements in the embodiment include elements that can be replaced and easily assumed by persons skilled in the art and elements that are substantially identical. In addition, a plurality of modifications described in the embodiment can be arbitrarily combined with one another within a scope obvious to persons skilled in the art.

Noise Elimination Device

Figure 1:
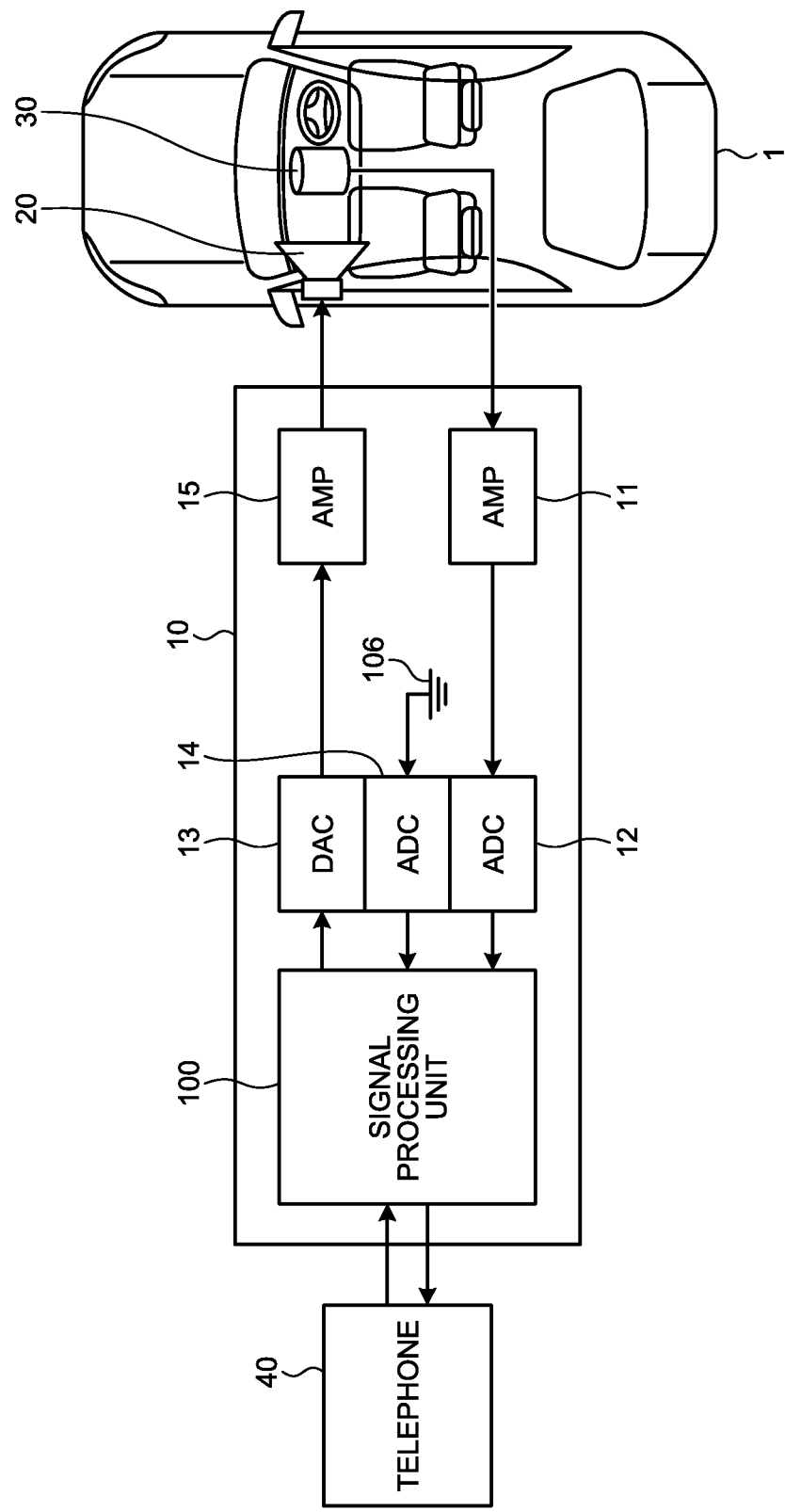
FIG. 1 is a diagram illustrating a configuration example of a noise elimination device according to an embodiment of the present invention.

FIG. 1 is a diagram illustrating a configuration example of a noise elimination device according to the present embodiment. In FIG. 1, a noise elimination device 10 according to the present embodiment is used by being incorporated in a vehicle 1. A speaker 20 and a microphone (hereinafter, abbreviated as "mic") 30 are incorporated in the vehicle 1. The speaker 20 outputs a voice in the vehicle 1. The speaker 20 converts an analog voice signal input thereto into a voice.

The mic 30 acquires a voice in the vehicle 1. The mic 30 converts the acquired voice into an analog voice signal.

The noise elimination device 10 includes a signal processing unit 100, amplifiers (hereinafter, AMP) 11 and 15, analog digital converters (hereinafter, ADC) 12 and 14, and a digital analog converter (hereinafter, DAC) 13.

The signal processing unit 100 performs, on digital voice data, a process of eliminating echo, noise, and the like other than a targeted voice. The signal processing unit 100 can be implemented by using a DSP (Digital Signal processing unit), for example. The signal processing unit 100 can be also implemented by an SOC (System-on-a-chip). The signal processing unit 100 can be also implemented by using both a DSP and an SOC.

The AMP 11 is a microphone amplifier. The AMP 11 amplifies an analog voice signal output from the mic 30.

The ADC 12 is a first converter that converts an analog voice signal input thereto into digital voice data. The digital voice data having been converted by the ADC 12 is input to the signal processing unit 100.

The DAC 13 converts digital voice data input thereto into an analog voice signal. The analog voice signal having been converted by the DAC 13 is input to the AMP 15.

The AMP 15 is a speaker amplifier. The AMP 15 amplifies an analog voice signal input thereto. The analog voice signal having been amplified by the AMP 15 is input to the speaker 20.

The ADC 14 is a second converter that converts an analog signal input thereto into digital data. The ADC 14 receives noise signals within the device itself, that is, within the noise elimination device 10. In the present embodiment, an input terminal of the ADC 14, to which a signal to be converted into digital data is input, is connected to an analog ground 106. The analog ground 106 is, for example, an analog ground of the AMP 11. The ADC 14 converts a voltage level of the analog ground 106 into digital data. Therefore, when noise interferes with the analog ground 106 that is ordinarily supposed to be 0 [V], the ADC 14 outputs digital data corresponding to the voltage level of the noise. The digital data having been converted by the ADC 14 is data corresponding to noise within the noise elimination device 10.

Noise from a power source voltage, a ground, and a midpoint voltage that are connected to the ADC 14 is mixed in the voice data that is a conversion result of the ADC 14, where the noise has the same components as components of the noise input to the ADC 12. By adding data converted by the ADC 14 as noise within the device itself to reference data, the noise elimination device 10 eliminates not only echo caused by the speaker 20 and the mic 30 but also noise within the device itself from an input voice to the mic 30, by using an echo eliminating process of the signal processing unit 100.

In order to eliminate noise effectively, it is preferable to input, to the ADC 14, noise having components as identical as possible to those of noise input to the ADC 12. Therefore, in the noise elimination device 10, it is preferable to implement the ADC 12 and the ADC 14 by using one integrated circuit including a plurality of ADCs. As for the noise elimination device 10 according to the present embodiment, an ADC integrated circuit having stereo input/output channels is prepared, and the ADC 12 is associated with one of the input/output channels and the ADC 14 is associated with the other input/output channel. The noise elimination device 10 implements the ADC 12 and the ADC 14 by using one integrated circuit in a physical sense. With this configuration, the ADC 12 and the ADC 14 have influences of noise components in the same manner. If the integrated circuit implementing the ADC 12 and the integrated circuit implementing the ADC 14 are different circuits in a physical sense, the influences of noise component that the ADC 12 and the ADC 14 respectively have may be different from each other. In contrast, when the ADC 12 and the ADC 14 provided in one integrated circuit in a physical sense are used, the ADC 12 and the ADC 14 have influences of noise component in the same manner, and thus noise can be eliminated more effectively as compared to a case where different ADC integrated circuits are respectively used for the ADC 12 and the ADC 14. This configuration is not limited to ADC integrated circuits having stereo input/output channels, and it suffices that the ADC 12 and the ADC 14 are implemented by each of converters included in plural in one integrated circuit in a physical sense.

A telephone 40 transmits a voice signal to a call counterpart and receives a voice signal from the call counterpart. The telephone 40 is a mobile phone or a smartphone, for example.

Signal Processing Unit

Figure 2:
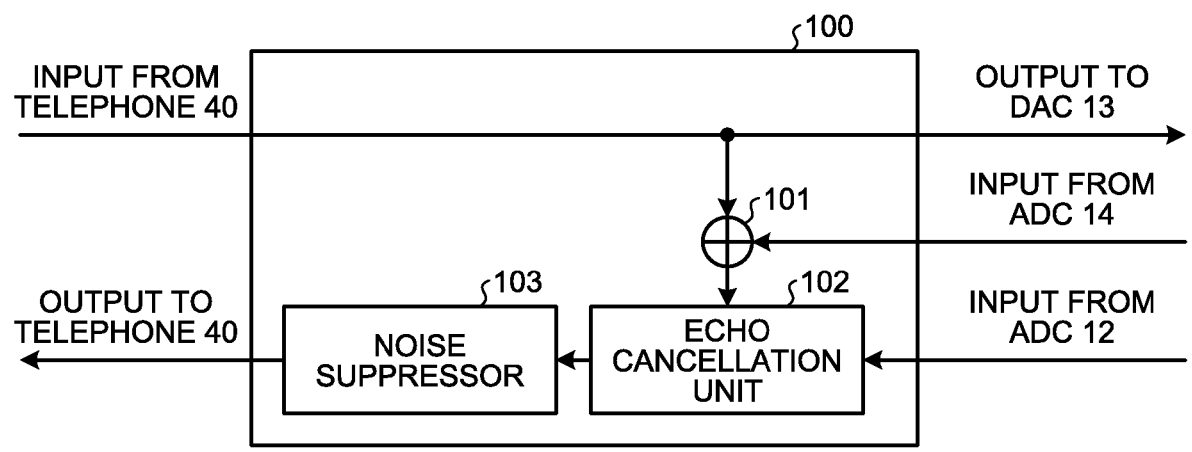
FIG. 2 is a diagram illustrating a configuration example of a signal processing unit in FIG. 1.

FIG. 2 is a diagram illustrating a configuration example of the signal processing unit 100 in FIG. 1. The signal processing unit 100 includes an addition unit 101, an echo cancellation unit 102, and a noise suppressor 103.

The addition unit 101 adds digital voice data to be output to the speaker 20 and digital data having been converted by the ADC 14. The addition result of the addition unit 101 is input to the echo cancellation unit 102 as reference data. The signal processing unit 100 may also include a delay unit that delays the reference data being input to the echo cancellation unit 102.

The echo cancellation unit 102 receives digital voice data as reference data. The reference data is voice data that is data before being converted into an analog voice signal to be output from the speaker 20. The echo cancellation unit 102 performs an echo eliminating process of eliminating components corresponding to the reference data from digital voice data generated by converting a voice signal having been input to the mic 30. The echo eliminating process is a process of subtracting components corresponding to the reference data from digital voice data generated by converting a voice signal having been input to the mic 30. By performing the echo eliminating process, it is possible not to include a voice to be output from the speaker 20 in a voice to be output to a call counterpart.

The noise suppressor 103 performs processing on digital voice data to suppress noise interfering with a voice. Particularly, the noise suppressor 103 performs a process of reducing road noise and the like. The addition unit 101, the echo cancellation unit 102, and the noise suppressor 103 can be implemented by using a DSP, for example.

Echo Cancellation Unit

Figure 3:
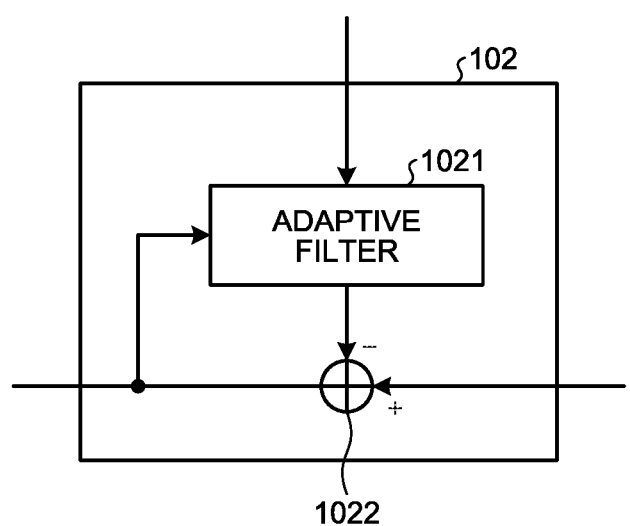
FIG. 3 is a diagram illustrating a configuration example of an echo cancellation unit in FIG. 2.

FIG. 3 is a diagram illustrating a configuration example of the echo cancellation unit 102. As illustrated in FIG. 3, the echo cancellation unit 102 includes an adaptive filter 1021 and a subtraction unit 1022.

The adaptive filter 1021 processes reference data based on characteristics of a space, which is an echo path from output from the speaker 20 to input to the mic 30, to generate cancellation data. More specifically, the adaptive filter 1021 generates cancellation data by multiplying characteristic information, in which characteristics of an echo path are simulated, by reference data. The adaptive filter 1021 performs a convolution process with an adaptive filter coefficient to generate cancellation data. The adaptive filter 1021 inputs the generated cancellation data to the subtraction unit 1022.

The subtraction unit 1022 subtracts cancellation data from voice data corresponding to a voice signal to be input to the mic 30. Output from the subtraction unit 1022 is input to the adaptive filter 1021 as error data. The adaptive filter 1021 performs an operation of updating a filter coefficient and converging an error signal to be minimum.

Operations

Next, operations of a handsfree system incorporated in the vehicle 1 are described. As for the operations of the handsfree system, operations of the noise elimination device 10 are mainly described.

In the present embodiment, noise within a device as well as echo are reduced by using an echo cancelling function. The echo cancellation unit 102 receives: reference data that is input of a sound source of a sound desired to be eliminated; and data in which a desired sound such as microphone input and an unnecessary sound desired to be eliminated are mixed, and outputs processed data from which the unnecessary sound desired to be eliminated has been eliminated. The echo cancellation unit 102 receives, as the reference date, output voice data to be generally output to the speaker 20 to thereby eliminate components corresponding to the reference data. By eliminating the voice from the speaker 20 that is input from the mic 30, a sound without echo can be obtained from the output from the echo cancellation unit 102.

A caller side path to a call counterpart is as follows. That is, the mic 30 acquires a voice in the vehicle 1. The mic 30 converts the acquired voice into an analog voice signal. The voice signal converted by the mic 30 is input to the AMP 11. The AMP 11 amplifies the voltage level of the voice signal. The AMP 11 adjusts the voltage level of the voice signal within an extent that the voltage is not clipped in a latter stage. The ADC 12 converts the analog voice signal having its level adjusted by the AMP 11 into digital voice data. The digital voice data having been converted by the ADC 12 is input to the signal processing unit 100. The signal processing unit 100 performs a process of eliminating echo on the digital voice data. The voice data having its echo eliminated by the signal processing unit 100 is output from the noise elimination device 10. The voice data output from the noise elimination device 10 is input to the telephone 40. The telephone 40 transmits the voice data to a telephone (not illustrated) of the call counterpart.

A receiver side path from a telephone of a call counterpart is as follows. That is, the telephone 40 outputs digital voice data received from the telephone of the call counterpart. The noise elimination device 10 receives digital voice data output from the telephone 40. The noise elimination device 10 performs necessary processing for the digital voice data in the signal processing unit 100. The signal processing unit 100 outputs the digital voice data. The digital voice data output from the signal processing unit 100 is input to the DAC 13. The DAC 13 converts the digital voice data input thereto into analog voice signal. The analog voice signal having been converted by the DAC 13 is input to the AMP 15. The AMP 15 amplifies the voltage level of the voice signal. The voice signal having its voltage level amplified by the AMP 11 is input to the speaker 20. The speaker 20 outputs a voice in the vehicle 1.

The speaker 20 and the mic 30 are provided in the vehicle 1. Therefore, the voice output from the speaker 20 in the vehicle 1 is input to the mic 30. In this case, echo is generated, thereby making it difficult to hear the voice. Accordingly, an echo eliminating process is performed in the echo cancellation unit 102 of the signal processing unit 100.

The echo cancellation unit 102 receives digital voice data as reference data. The digital voice data as reference data is voice data before being converted into an analog voice signal to be output from the speaker 20. Digital data having been converted by the ADC 14 and corresponding to noise is added to the reference data by the addition unit 101. The echo cancellation unit 102 performs an echo eliminating process of subtracting a component corresponding to the reference data from digital voice data generated by converting a voice signal input to the mic 30. By performing the echo eliminating process, it is possible not to include the voice to be output from the speaker 20 in a voice to be output to a call counterpart.

As described above, in the present embodiment, data generated by adding data of an input voice of the mic 30 and data having been converted by the ADC 14 is used as the reference data of the echo cancellation unit 102. Noise from a ground connected to the ADC 14 enters the ADC 14, where the noise has the same components as components of the noise entering the ADC 12. By adding data corresponding to the noise within the device to the reference data, it is possible to eliminate, by using an echo cancelling operation, not only echo from the speaker 20 to the mic 30 but also the noise within the device itself from voice data to be output to a call counterpart.

Comparative Example

Next, an echo elimination device of a comparative example is described. The echo elimination device according to the comparative example has a configuration in which the ADC 14 is not provided in the noise elimination device 10 illustrated in FIG. 1 and that the addition unit 101 is not provided in FIG. 2.

Figure 4:
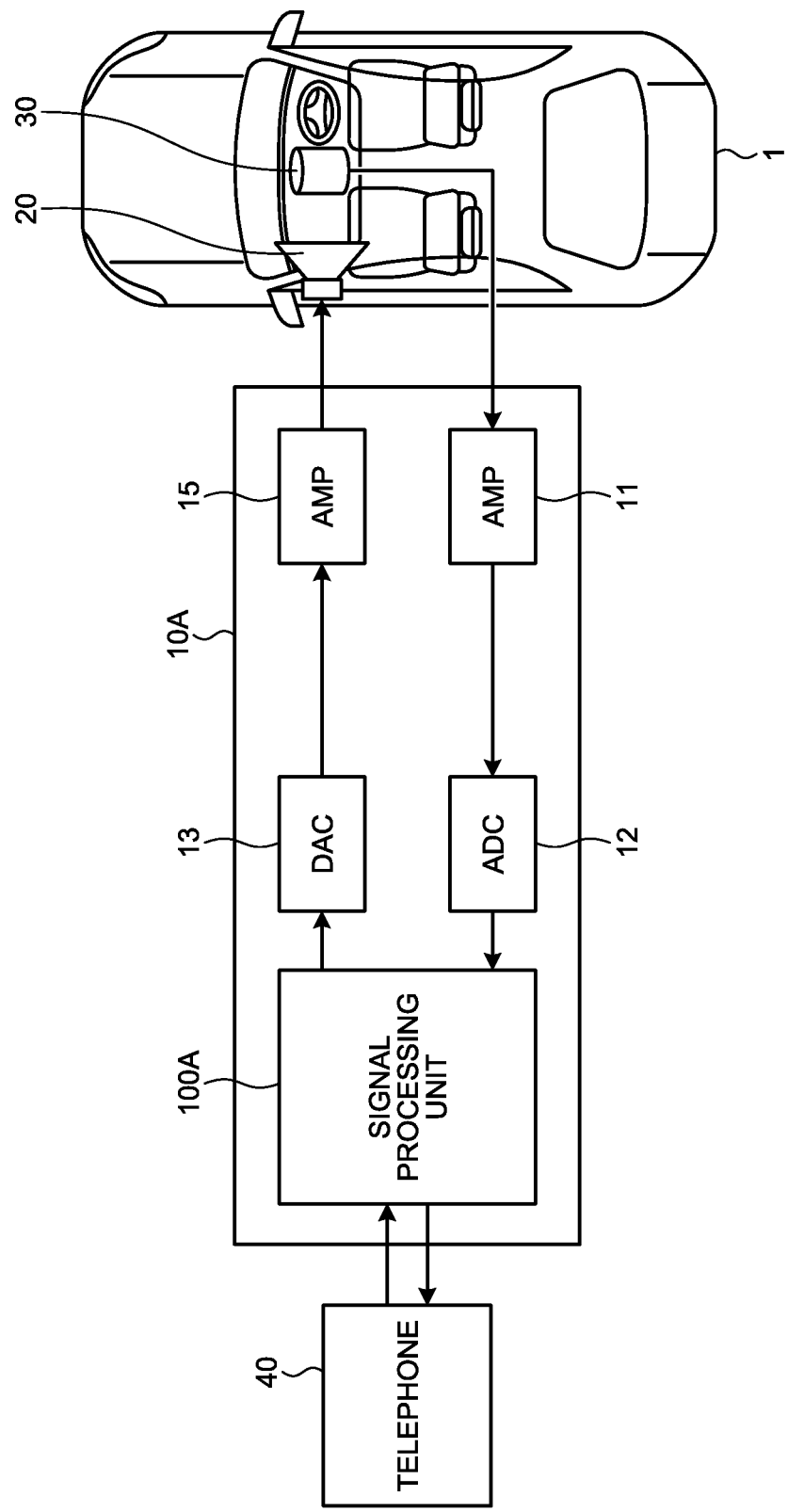
FIG. 4 is a diagram illustrating a configuration of an echo elimination device according to a comparative example.
Figure 5:
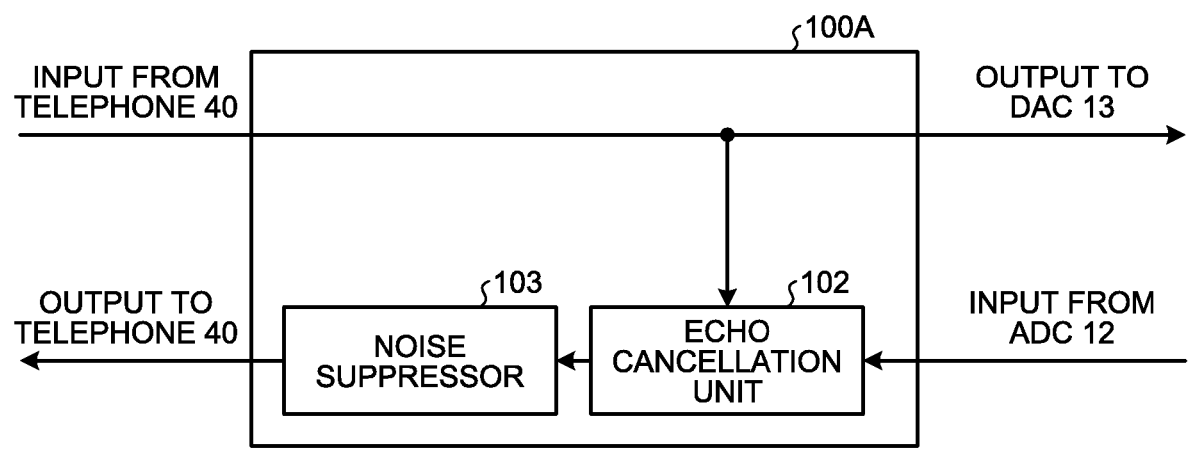
FIG. 5 is a diagram illustrating a configuration example of a signal processing unit in the echo elimination device in FIG. 4.

FIG. 4 is a diagram illustrating a configuration of an echo elimination device 10A according to the comparative example. FIG. 5 is a diagram illustrating a configuration example of a signal processing unit 100A in the echo elimination device 10A in FIG. 4. The comparative example has a configuration in which the ADC 14 and the addition unit 101 are not provided, and output from the ADC 14 is not added to reference data.

A caller side path to a call counterpart is as follows. That is, an analog voice signal output from the AMP 11 is converted into digital voice data in the ADC 12, and the converted voice data is input to the signal processing unit 100A. The signal processing unit 100A performs a process of eliminating echo on the digital voice data. The voice data having its echo eliminated by the signal processing unit 100A is output from the echo elimination device 10A.

A receiver side path from a call counterpart is identical to the path described above with reference to FIG. 1 and FIG. 2. That is, digital voice data output from the signal processing unit 100A of the echo elimination device 10A is converted into an analog voice signal by the DAC 13 and the converted analog voice signal is input to the AMP 15. With the voice signal having its voltage level amplified by the AMP 15, a voice is output from the speaker 20.

In FIG. 5, the echo cancellation unit 102 receives digital voice data as reference data and generates cancellation data. The echo cancellation unit 102 performs an echo eliminating process of subtracting the cancellation data from digital voice data generated by converting a voice signal having been input to the mic 30.

In the signal processing unit 100A subsequent to the ADC 12 in FIG. 4, because digital processing is performed, analog noise does not interfere. Examples of noise other than voices to be input to the mic 30 include noise interfering with wiring from the mic 30 to the AMP 11, noise interfering with a power source or a ground of the AMP 11, and noise interfering with a power source, a ground, or a midpoint voltage of the ADC 12. Noise of a power source of a device as well as ground noise causes influences on a noise floor of a signal input to the mic 30.

The AMP 11 adjusts a voltage so as not to be clipped and lowers a sound volume, and thus, if a voice is amplified to a prescribed sound volume, there is a case where the noise within the device itself described above is also amplified. Therefore, it is necessary to reduce the noise in wiring of the mic 30. The noise component mixed in a signal in the wiring of the mic 30 can be eliminated by setting the differential input on the input side of the AMP 11 and acquiring a difference between input voltages. However, noise interfering with the power source or the ground within the device cannot be eliminated.

Further, the mic 30 for a handsfree system requires a high dynamic range. The mic 30 is designed such that, even when a large sound is input thereto, its waveform does not exceed a permissible level of input to the mic 30 and the ADC 12. Therefore, in a normal state, the level of the voice signal acquired from the mic 30 is very small, and thus when the level of noise is large, the voice is buried in the noise and becomes difficult to be heard.

Advantages Over Comparative Example

In contrast, the noise elimination device 10 according to the present embodiment described with reference to FIG. 1 to FIG. 3 includes the ADC 14. The ADC 14 converts noise within the device into digital data. The digital data having been converted by the ADC 14 is added to reference data by the addition unit 101. The echo cancellation unit 102 performs an echo eliminating process based on the reference data including the noise within the device. In this manner, by using an echo eliminating function provided in the noise elimination device 10, noise is eliminated as well as echo components. It is not necessary to separately perform a process of eliminating noise interfering with a power source or a ground, and noise can be eliminated without increasing the processing load of the device on the whole.

As the noise within the device can be eliminated, it is possible to lower the intensity of a noise suppressor that reduces road noise and the like, and thus the quality of voices to be output is not degraded. Further, as the noise is reduced, there are advantages that the signal-to-noise ratio is improved and voices become more audible. In addition, smaller voices that are buried in the noise within the device can be heard, and thus these voices are not drowned out by the functions of a noise suppressor or of an echo suppressor.

Modification

In the noise elimination device 10 described with reference to FIG. 1 to FIG. 3, an analog ground is input to the ADC 14. As a modification, a voltage between a power source and an analog ground voltage may be input to the ADC 14.

Figure 6:
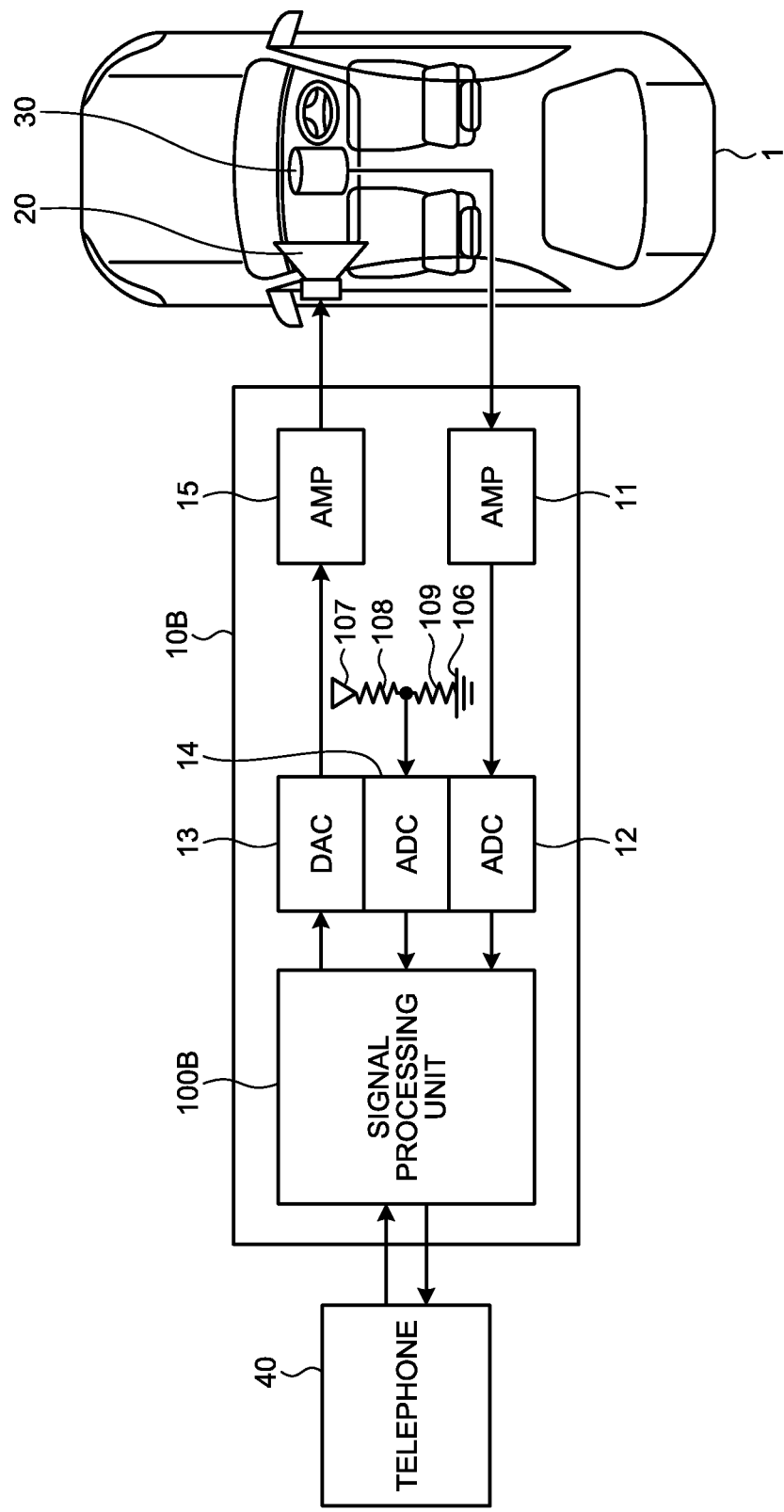
FIG. 6 is a diagram illustrating a configuration of a noise elimination device according to a modification.

FIG. 6 is a diagram illustrating a configuration of a noise elimination device 10B according to the modification. As illustrated in FIG. 6, the noise elimination device 10B according to the present modification includes a resistance element 108 and a resistance element 109 provided between a power source 107 and the analog ground 106. The resistance element 108 and the resistance element 109 are connected in series between the power source 107 and the analog ground 106. A connection point between the resistance element 108 and the resistance element 109 is connected to an input terminal of the ADC 14. Therefore, a voltage value that is set based on a ratio of a resistance value of the resistance element 108 and a resistance value of the resistance element 109 according to a resistive voltage division is input to the ADC 14. For example, as the resistance element 108 and the resistance element 109 are set to have the same resistance value, a valtage value of a midpoint between the voltage value of the power source 107 and 0 [V] of the analog ground 106 is input to the ADC 14. That is, in the ADC 14, the voltage value of an input terminal, to which a signal to be converted into digital data is input, is set to a voltage value between the voltage of the power source 107 and that of the analog ground 106, and a noise signal of the set voltage value is converted into digital data.

Accordingly, when noise interferes with a voltage value (hereinafter, "set voltage value") that is set based on the resistance values of the resistance element 108 and the resistance element 109, the noise component interfering with the set voltage value is converted into digital data by the ADC 14. Data of the noise component having been converted by the ADC 14 is input to a signal processing unit 100B.

Figure 7:
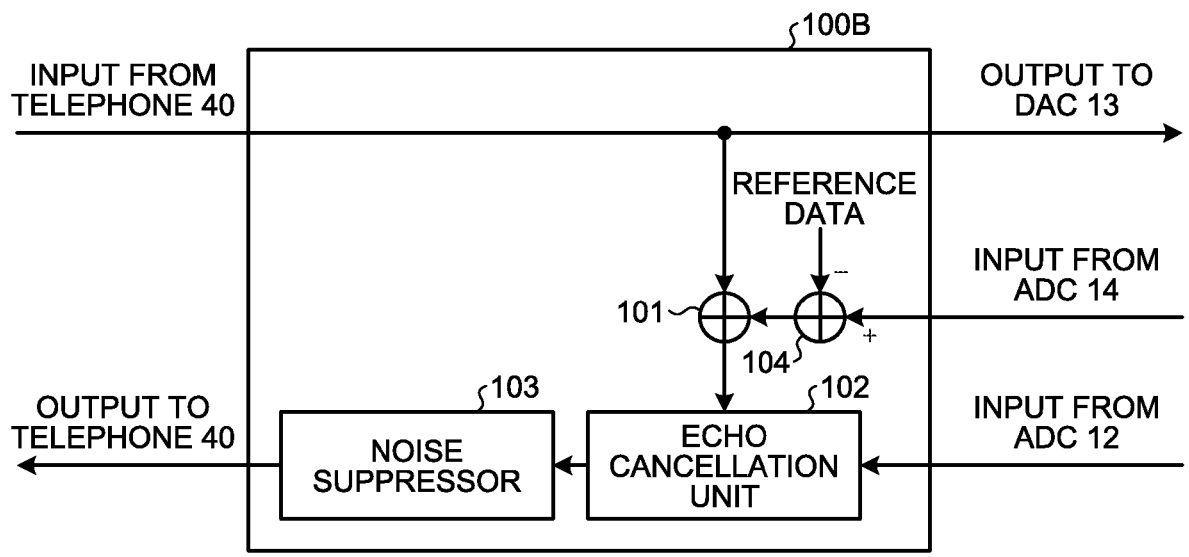
FIG. 7 is a diagram illustrating a configuration example of a signal processing unit in the noise elimination device in FIG. 6.

FIG. 7 is a diagram illustrating a configuration example of the signal processing unit 100B in the noise elimination device 10B in FIG. 6. The signal processing unit 100B according to the present modification includes the addition unit 101, the echo cancellation unit 102, the noise suppressor 103, and a subtraction unit 104. The subtraction unit 104 subtracts reference data from data of a noise component having been converted by the ADC 14. The reference data is digital data corresponding to the set voltage value. The addition unit 101, the echo cancellation unit 102, the noise suppressor 103, and the subtraction unit 104 can be implemented by using a DSP, for example.

When any noise component is not mixed in a signal input to the input terminal of the ADC 14, digital data having its set voltage value converted by the ADC 14 is input to the subtraction unit 104. When any noise component is not mixed in the signal, the digital data input to the subtraction unit 104 matches the reference data. Therefore, when the subtraction unit 104 subtracts the reference data from the digital data, the output data of the subtraction unit 104 becomes data corresponding to 0 [V]. The data corresponding to 0 [V] is input to the addition unit 101.

When a noise component is mixed in a signal input to the input terminal of the ADC 14, digital data generated by converting a signal in which the noise component is added to the set voltage value by the ADC 14 is input to the subtraction unit 104. When a noise component is mixed in the signal, the digital data input to the subtraction unit 104 does not match the reference data. Therefore, when the subtraction unit 104 subtracts the reference data from the digital data, the output data of the subtraction unit 104 becomes data corresponding to the noise component rather than data corresponding to 0 [V]. The data corresponding to the noise component is input to the addition unit 101.

As described above, the addition result of the addition unit 101 is input to the echo cancellation unit 102 as reference data. As described above, the echo cancellation unit 102 performs noise elimination along with an echo eliminating process.

By adjusting the ratio of the resistance value of the resistance element 108 and the resistance value of the resistance element 109 in advance, a noise component having a level approximate to that of the analog ground 106 or a noise component having a level approximate to that of the voltage of the power source 107 is input to the ADC 14 to thereby perform noise elimination along with an echo eliminating process. That is, by setting a level at which a noise component is easily mixed in by using the resistance element 108 and the resistance element 109, it is possible to perform noise elimination more effectively. For example, when noise interfering with a power source is large, the ratio of resistance values is set so that a voltage value more approximate to a power-source voltage value rather than a midpoint voltage is input to the ADC 14.

As described above, data generated by adding data of an input voice of the mic 30 and data having been converted by the ADC 14 are used as reference data of the echo cancellation unit 102. Noise from a power source voltage, an analog ground, and a midpoint voltage that are connected to the input terminal of the ADC 14 enters the ADC 14 with the same components as the components of the noise input to the ADC 12. By adding data corresponding to the noise within the device to the reference data, it is possible to eliminate, by using an echo cancelling operation, not only echo from the speaker 20 to the mic 30 but also the noise within the device itself from voice data to a call counterpart.

Example of Echo Eliminating Process

Figure 8:
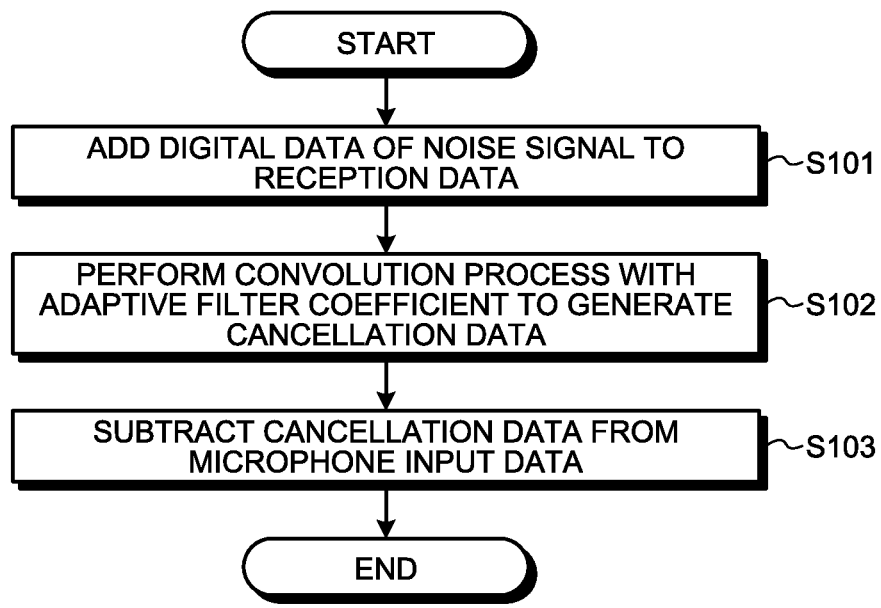
FIG. 8 is a flowchart illustrating an example of an echo eliminating operation performed by the signal processing unit.

FIG. 8 is a flowchart illustrating an example of an echo eliminating operation performed by the signal processing unit 100. At Step S101, the addition unit 101 adds digital data of a noise signal to reception data received from a communication counterpart. At Step S102, the adaptive filter 1021 that receives the added digital data as reference data performs a convolution process with an adaptive filter coefficient to generate cancellation data. At Step S103, the subtraction unit 1022 subtracts the cancellation data from digital data to be transmitted to the communication counterpart.

Noise Elimination Method

The following noise elimination method is performed by the noise elimination device described above. That is, there is implemented a noise elimination method including: a step of converting an input signal from a microphone into digital data by a first converter to generate input digital data; a step of converting an internal noise signal into digital data by a second converter; and a step of using, as reference data, digital data corresponding to an output signal to a speaker and digital data having been converted by the second converter and of eliminating a component corresponding to the reference data from the input digital data by a signal processing unit. According to the noise elimination method, noise interferes with the inside of a device itself can be eliminated as well as echo.

Noise Elimination Program

The noise elimination device described above can be implemented by using a noise elimination program causing a computer to function as: an addition unit that adds digital data of an internal noise signal to reception data received from a communication counterpart; and an echo cancellation unit that subtracts cancellation data, which is generated by using the added digital data as reference data and by processing the reference data based on characteristic information in which the reference data and characteristics of an echo path are simulated, from a transmission signal to the communication counterpart. By using the noise elimination program, noise interfering with the inside of a device itself can be eliminated as well as echo.

SUMMARY

As described above, in the present embodiments, noise is eliminated as well as echo components by using an echo eliminating function provided in an echo cancellation unit. Noise can be eliminated while it is not necessary to specifically perform processing such as cumulative addition processing for eliminating noise interfering with a power source or a ground and without increasing the processing load of the device on the whole.

The noise elimination device according to the present embodiments can be applied to devices including a microphone and a speaker. For example, the noise elimination device can be applied to a videophone, handsfree communication using a mobile telephone or a smartphone, a video conference system, and a karaoke machine, as well as a handsfree system in a car such as an in-vehicle communication system.

According to an aspect of the present disclosure, noise interfering with the inside of a device can be eliminated as well as echo.

What is claimed is:

1. A noise elimination device comprising:
a first converter configured to convert an input signal input from a microphone into digital data to generate input digital data;
a second converter configured to convert an internal noise signal into digital data; and
a signal processing unit configured to
use, as reference data, digital data corresponding to an output signal output to a speaker and digital data having been converted by the second converter, and eliminate a component corresponding to the reference data from the input digital data.

2. The noise elimination device according to claim 1, wherein
in the second converter, an input terminal to which a signal to be converted into digital data is input is connected to an analog ground, and
the second converter is configured to convert a noise signal of the analog ground into digital data.

3. The noise elimination device according to claim 1, wherein
in the second converter, a voltage value of an input terminal to which a signal to be converted into digital data is input is set to a voltage value between a voltage of a power source and a voltage of an analog ground, and
the second converter is configured to convert a noise signal of the set voltage value into digital data.

4. The noise elimination device according to claim 1, wherein
the signal processing unit includes an addition unit configured to add digital data corresponding to an output signal output to the speaker and digital data having been converted by the second converter, and
output of the addition unit is the reference data.

5. The noise elimination device according to claim 1, wherein the signal processing unit includes
an adaptive filter, to which the reference data is input, configured to output cancellation data generated by processing the reference data based on characteristics of a space from output from the speaker to input to the microphone, and a subtraction unit configured to subtracts the cancellation data from the input digital data.

6. The noise elimination device according to claim 1, wherein the first converter and the second converter are provided in one integrated circuit in a physical sense.

7. A noise elimination method comprising:
converting an input signal input from a microphone into digital data by a first converter to generate input digital data;
converting an internal noise signal into digital data by a second converter; and
using, as reference data, digital data corresponding to an output signal output to a speaker and digital data having been converted by the second converter and eliminating a component corresponding to the reference data from the input digital data by a signal processing unit.

8. A non-transitory computer-readable medium containing noise elimination program for causing a computer to function as:
an addition unit configured to add digital data of an internal noise signal to reception data received from a communication counterpart; and
an echo cancellation unit configured to subtract cancellation data, which is generated by using the added digital data as reference data and by processing the reference data based on characteristic information in which the reference data and characteristics of an echo path are simulated, from a transmission signal to the communication counterpart.

* * * * *